United States Patent [19]
Onoue

[11] Patent Number: 6,123,591
[45] Date of Patent: Sep. 26, 2000

[54] SHIFTING MECHANISM FOR MARINE TRANSMISSION

[75] Inventor: Akihiro Onoue, Shizuoka, Japan

[73] Assignee: Sanshin Kogyo Kabushiki Kaisha, Japan

[21] Appl. No.: 09/181,723

[22] Filed: Oct. 28, 1998

[30] Foreign Application Priority Data

Oct. 28, 1997 [JP] Japan .................................. 9-311255

[51] Int. Cl.⁷ .................................................. B63H 23/08
[52] U.S. Cl. ........................................ 440/75; 192/48.91
[58] Field of Search ..................... 440/75, 86; 192/51, 192/48.7, 48.91, 21, 53.1

[56] References Cited

U.S. PATENT DOCUMENTS

| | | | |
|---|---|---|---|
| 2,284,589 | 5/1942 | Rippingille | 192/53.1 |
| 3,148,557 | 9/1964 | Shimanckas . | |
| 3,161,270 | 12/1964 | Aschauer | 192/53.1 |
| 3,580,371 | 5/1971 | Kron et al. | 192/53.1 |
| 4,287,973 | 9/1981 | Eichinger et al. | 192/48.91 |
| 4,570,776 | 2/1986 | Iwashita et al. . | |
| 4,689,027 | 8/1987 | Harada et al. . | |
| 4,793,773 | 12/1988 | Kinouchi et al. . | |
| 4,820,210 | 4/1989 | Dretzka | 440/75 |
| 4,957,460 | 9/1990 | Harada et al. . | |
| 4,966,267 | 10/1990 | Carlton | 192/48.91 |
| 5,006,084 | 4/1991 | Handa | 440/75 |
| 5,449,306 | 9/1995 | Nakayasu et al. | 440/75 |
| 5,520,559 | 5/1996 | Nakayasu et al. | 440/75 |
| 5,556,312 | 9/1996 | Ogino . | |
| 5,575,698 | 11/1996 | Ogino . | |
| 5,597,334 | 1/1997 | Ogino . | |
| 5,788,546 | 9/1998 | Ogino . | |

FOREIGN PATENT DOCUMENTS

| | | |
|---|---|---|
| 64-28093 | 1/1989 | Japan . |
| 1-105041 | 4/1989 | Japan . |
| 1-309890 | 12/1989 | Japan . |

*Primary Examiner*—Stephen Avila
*Assistant Examiner*—Lars A. Olson
*Attorney, Agent, or Firm*—Knobbe, Martens, Olson & Bear, LLP

[57] ABSTRACT

A marine drive includes an improved transmission and shifting mechanism to facilitate a smoother transition when shifting into a reverse drive condition. The transmission includes a positive clutch and a friction-type sub-clutch. The shifting mechanism desirably includes a shift cam with first and second cam surfaces. The first cam surface effects actuation of the positive clutch and the second cam surface effects actuation of the friction sub-clutch. The first and second cam surfaces are configured so that the shifting mechanism causes the friction sub-clutch to engage before the positive clutch engages. As a result, the instantaneous loading on an engine of the marine drive when shifting the transmission into reverse is reduced.

26 Claims, 4 Drawing Sheets

# SHIFTING MECHANISM FOR MARINE TRANSMISSION

BACKGROUND OF THE INVENTION

1. Field of the Invention

The present invention relates to a marine drive, and more particularly to an improved shifting mechanism for a transmission of the marine drive.

2. Description of Related Art

Outboard motors typically include a power head supported by an upper housing. A clamping bracket usually secures the upper housing to a transom of an associated watercraft. The upper housing also supports a lower unit that includes a propeller or similar propulsion device. An engine within a cowling of the power head drives the propeller via a drive train. The drive train commonly includes a drive shaft, which extends generally vertically through the upper housing, and a propeller shaft, which lies at about a 90 degree shaft angle with respect to the drive shaft.

Outboard motors also commonly employ a forward/neutral/reverse-type transmission which operates between the drive shaft and the propulsion shaft. The transmission typically includes a drive pinion and a pair of oppositely rotating driven bevel gears that are journaled within a lower unit of the outboard motor. A dog clutch sleeve couples the propulsion shaft to one of the driven bevel gears to rotate the propeller in either rotational direction to establish a forward or reverse drive condition.

An actuator actuates the clutch. In a conventional transmission, the actuator moves the dog clutch sleeve into engagement with the front gear to establish a forward drive condition, and moves the dog clutch sleeve into engagement with the rear gear to establish a reverse drive condition. The conventional actuator involves a plunger actuated by a cam. A spring, acting on an opposite end of the plunger from the cam, forces the plunger to follow the cam. The spring thus forces the dog clutch sleeve to engage the front gear. To disengage the clutch and to engage the clutch with the rear gear, the cam forces the plunger and the clutch out of engagement and moves the clutch into engagement with the rear gear.

Several drawbacks are associated with the conventional type of transmission described above. The teeth of the gears and clutch are not static, and the synchronization of the teeth is not a constant condition. Under most conditions, the teeth of the clutch and the gears are out of phase. Thus, engagement may not be instantaneous and may not be as quick as the watercraft operator would like.

In addition, the instantaneous positive engagement between the clutch and the gear places a large load on the engine, especially when quickly shifting between forward and reverse drive conditions as performed when maneuvering within the tight confines of a marina or when quickly decelerating. Under such conditions, the engine is instantaneously engaged with the propulsion shaft and the impeller, which are rotating in an opposite direction from the direction in which the engine is attempting to drive them. Under such conditions, the engine may stall.

SUMMARY OF THE INVENTION

In view of the foregoing drawbacks and shortcomings of prior transmission and shifting mechanisms, a need exists for a shifting mechanism and a transmission which improves the smoothness of torque transmission between the engine and the propulsion shaft when quickly shifting from forward to reverse.

One aspect of the present invention thus involves a shifting mechanism for a marine drive that includes a transmission. The transmission comprises a forward and reverse gear and a main clutch that operates between the gears. The main clutch is adapted to selectively couple one of the gears to a propulsion shaft by moving the main clutch between forward, neutral and reverse drive positions via the shifting mechanism. The shifting mechanism includes a shift cam having a first cam surface that is adapted to actuate the main clutch. A second cam surface of the shift cam is adapted to act upon the propulsion shaft. A sub-clutch also operates between the propulsion shaft and the reverse gear. The first and second cam surface are configured so as to actuate the sub-clutch before actuating the main clutch when the shifting mechanism moves the main clutch to establish one of the drive conditions.

Another aspect of the present invention involves a marine drive comprising a transmission that selectably couples a propulsion shaft to a drive shaft. The propulsion shaft drives a propulsion device. The transmission includes a drive gear and at least one driven gear that together operate between the drive shaft and the propulsion shaft. A first clutch operates between the driven gear and the propulsion shaft, and a second clutch also operates between the driven gear and the propulsion shaft. The second clutch is arranged so as to couple together the driven gear and the propulsion shaft before the first clutch couples together the driven gear and the propulsion shaft. In one mode, the first clutch includes a positive clutch element, and the second clutch includes a friction clutch element.

In accordance with additional aspects of the present invention, a marine drive is provided having a transmission that selectively couples a propulsion shaft to a drive shaft under at least one drive condition. The propulsion shaft drives a propulsion device. The transmission includes a drive gear and at least one driven gear that together operate between the drive shaft and the propulsion shaft. A main clutch operates between the driven gear and the propulsion shaft, and a sub-clutch also operates between the driven gear and the propulsion shaft. Means are provided for actuating the sub-clutch before actuating the main clutch when establishing at least one drive condition so as to smooth the torque transmission when shifting into the one drive condition. In one mode of operation, the sub-clutch couples the driven gear to the propulsion shaft by frictional engagement before the main clutch positively couples the driven gear to the propulsion shaft when establishing a reverse drive condition.

Further aspects, features and advantages of the present invention will now become apparent from a detailed description of a preferred embodiment which follows.

BRIEF DESCRIPTION OF THE DRAWINGS

The annexed drawings illustrate a preferred embodiment of the present marine drive. This embodiment, however, is intended to illustrate and not to limit the invention. The drawings contain the following figures.

DETAILED DESCRIPTION OF THE PREFERRED EMBODIMENT OF THE INVENTION

Figure 1:
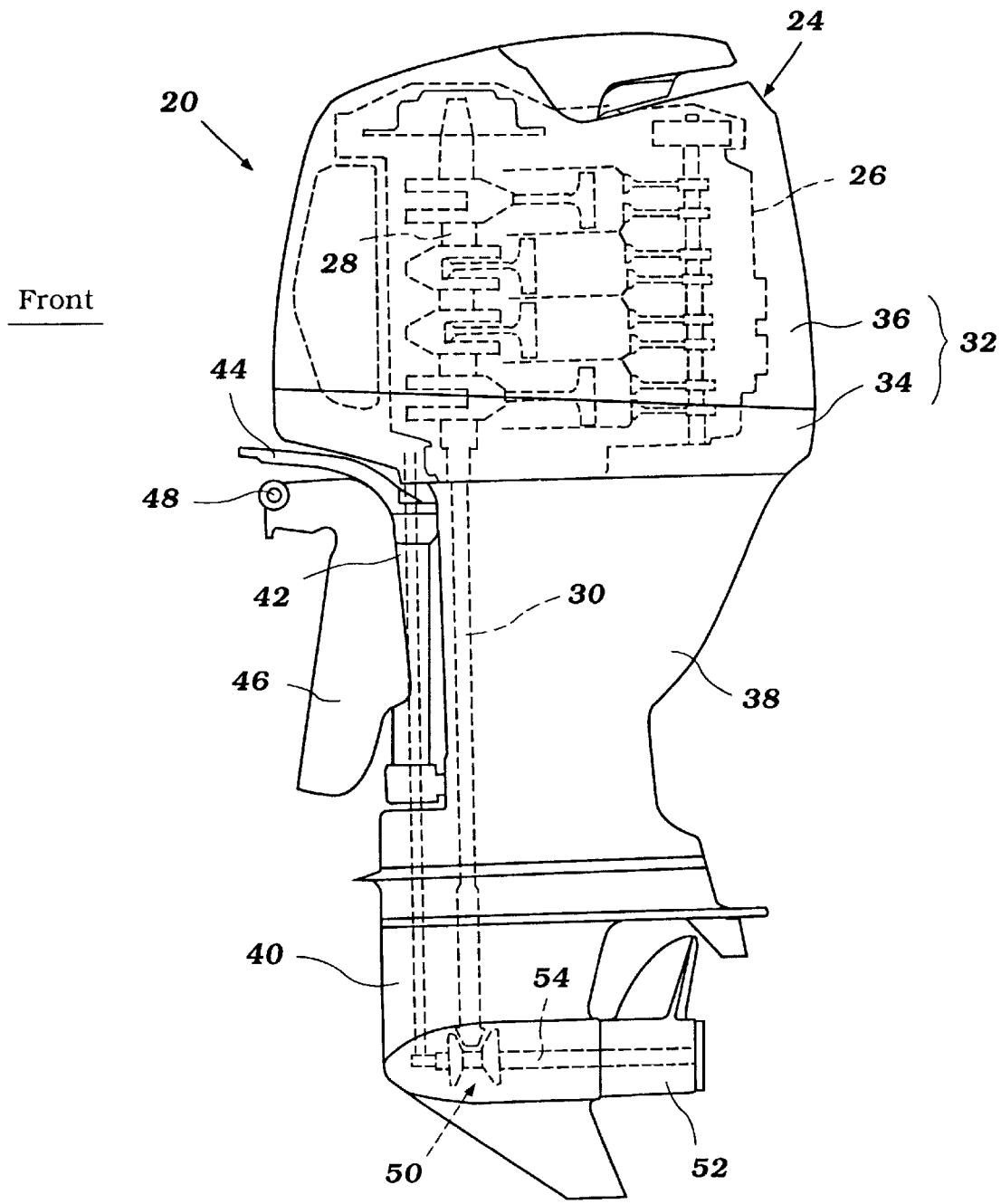
FIG. 1 is a side elevational view of an outboard motor configured in accordance with the preferred embodiment of the present invention, and illustrates several internal components of the outboard motor in phantom.

FIG. 1 illustrates a marine drive 20 which is configured in accordance with preferred embodiment of the present invention. In the illustrates embodiment, the marine drive 20 is depicted as an outboard motor for mounting on a transom at the stem of a watercraft (not shown). It is contemplated, however, that the present transmission and shifting mechanism can be incorporated with other types of marine drives as well.

Figure 2:
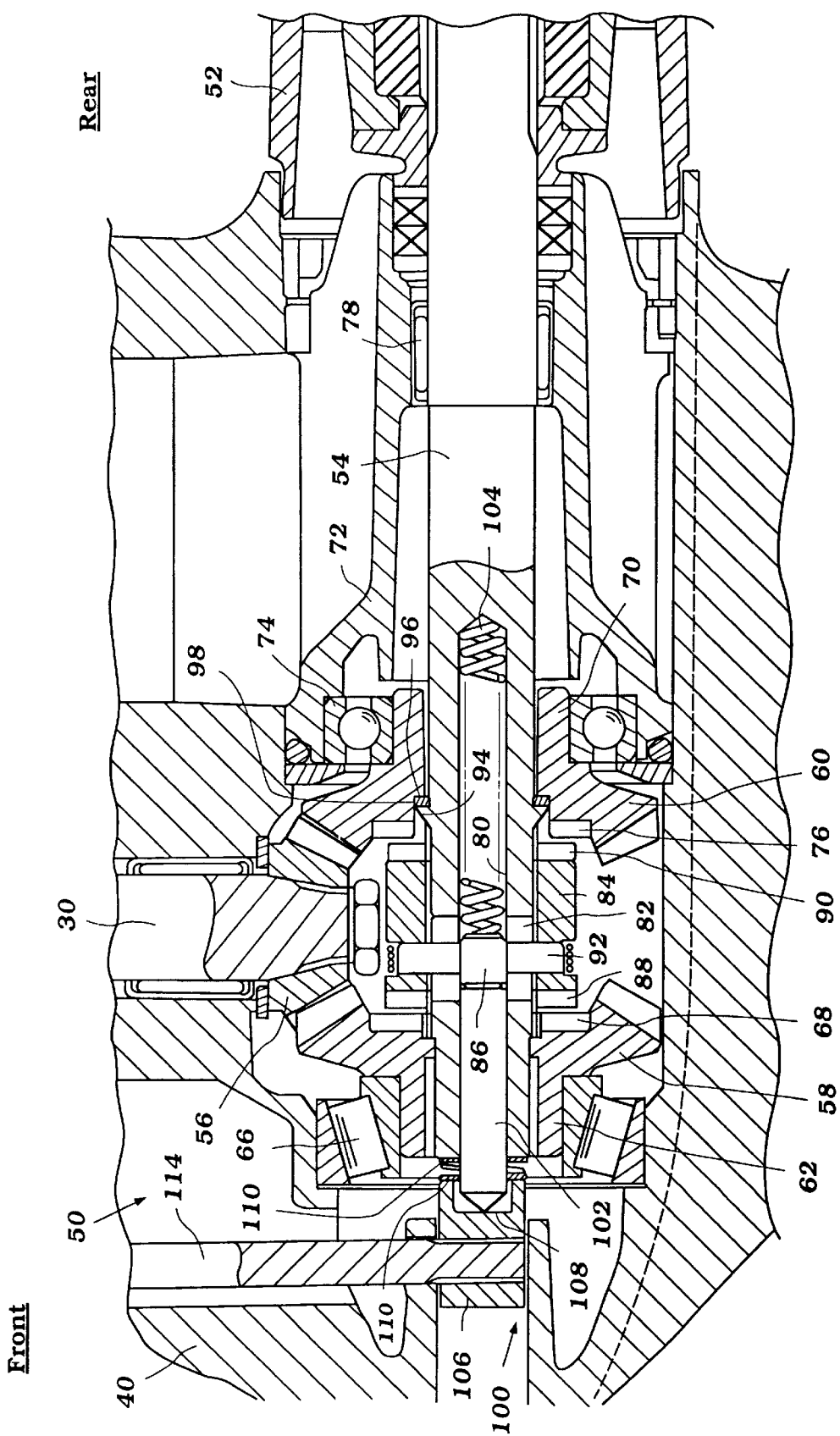
FIG. 2 is an enlarged partial sectional view of a lower unit of the outboard motor of FIG. 1 and illustrates a transmission and a shifting mechanism configured in accordance with the preferred embodiment.

In order to facilitate the description of the present outboard motor 20, the terms "front" and "rear" are used to indicate positions of the outboard motor components relative to a fixed datum: the transom of the watercraft. Thus, as used herein, "front" refers to a position or a side that would be closer to the watercraft transom when mounted thereon, and "rear" refers to a position or side that would be distanced from the transom. FIGS. 1 and 2 included labels to further aid the reader's understanding.

With initial reference to FIG. 1, the outboard motor 20 has a power head 24 that includes an internal combustion engine 26. Because the present engine transmission and shift mechanism has particular utility with a four-cycle, four cylinder engine, the present invention will be described in connection with such an engine; however, the depiction of the present invention in conjunction with a four-cycle engine 26 is merely exemplary. Those skilled in the art, however, will readily appreciate that the present outboard motor can include engines having any number of cylinders, having any number of cylinder arrangements or orientations (e.g., V-type or slanted), and/or operating on other than a four-stroke principle.

As typical with the outboard motor practice, the engine 26 is supported within the power head 24 so that a crankshaft 28 of the engine 26 rotates about a generally vertical axis within a crankcase. The crankshaft 28 drives a drive shaft 30 which depends from the power head 24 and rotates about the generally vertical axis, as described below.

As seen in FIG. 1, a protective cowling assembly 32 surrounds the engine 26. The cowling assembly 32 includes a lower tray 34 and a top cowling 36. The tray 34 and cowling 36 together define a compartment which houses the engine 26 with the lower tray 34 encircling a lower portion of the engine 26.

A drive shaft housing 38 extends from the lower tray 34 and terminates in a lower unit 40. The drive shaft 30 extends through the drive shaft housing 38 and is suitably journalled therein for rotation about the vertical axis.

A steering shaft assembly 42 is affixed to the drive shaft housing 38 in a conventional manner. Steering movement occurs about a generally vertical axis which extends through a steering shaft (not shown) of the steering shaft assembly 42. A steering arm 44, which is connected to an upper end of the steering shaft, extends in a forward direction for manual steering of the outboard motor 20, as known in the art.

The steering shaft assembly 42 also is pivotally connected to a clamping bracket 46 by a pivot pin 48. This conventional coupling permits the outboard motor 20 to be pivoted relative to the pivot pin 48 to permit adjustment of the trim position of the outboard motor 20 and for tilt-up of the outboard motor 20.

Although not illustrated, it is understood that a conventional hydraulic tilt and trim cylinder assembly, as well as a conventional steering cylinder assembly, can be used as well with the present outboard motor 20. The construction of the steering and trim mechanisms is considered to be conventional, and for that reason, further description is not believed necessary for an appreciation or understanding of the present invention.

With reference to FIGS. 1 and 2, the drive shaft 30 continues from the drive shaft housing 38 into the lower unit 40, where it drives a transmission 50. The transmission 50 establishes a driving condition of a propulsion device 52, which can take the form of a propeller, a hydrodynamic jet, or the like. The transmission 50 advantageously is a forward/neutral/reverse-type transmission. In this manner, the propulsion device 52 can drive the watercraft in any of these three operating states.

As seen in FIG. 1, a propulsion shaft 52 extends from the transmission 50 and supports the propulsion device 52 at its aft end. The transmission 50 transfers power from the drive shaft 30 to the propulsion shaft 54. In the illustrated embodiment, these shafts lie at about a 90° shaft angle; however, it is understood that the present invention can be used with a transmission which allows for power transfer at different shaft angles.

The individual components of the present transmission and shifting mechanism will now be described with reference to FIGS. 2–4. As seen in FIG. 2, the lower end of the drive shaft 30 is suitably journaled within the lower unit 40 by a pair of bearing assemblies. At the lower end, the drive shaft 30 carries a drive gear or pinion 56 which forms a portion of the transmission 50. The pinion 56 preferably is a bevel-type gear.

The transmission 50 also includes a pair of counter-rotating driven gears 58, 60 that are in mesh engagement with the pinion 56. The pair of driven gears 58, 60 preferably are positioned on diametrically opposite sides of the pinion 56, and are suitably journaled within the lower unit 40, as described below. Each driven gear 58, 60 is positioned at about a 90° shaft angle with the drive shaft 30. That is, the propulsion shaft 54 and the drive shaft 30 desirably intersect at about a 90° shaft angle as noted above; however, it is contemplated that the drive shaft 30 and the propulsion shaft 54 can intersect at almost any angle.

In the illustrated embodiment, the pair of driven gears 58, 60 are a front bevel gear 58 and an opposing rear bevel gear 60. The front bevel gear includes a hub 62 which is journaled within the lower unit 40 by a front thrust bearing 66. The thrust bearing 66 rotatably supports the front gear 58 in mesh engagement with the pinion 56.

As seen in FIG. 2, the hub 62 has a central bore through which the propulsion shaft 54 extends. The propulsion shaft 54 is suitably journaled within the central bore of the front gear hub 62.

The front gear 58 also includes a series of teeth 68 on an annular rear-facing engagement surface. The teeth 68 on the engagement surface form a portion of a positive clutch. That is, the teeth 68 positively engage a clutch element of the transmission 50 to form a positive main clutch, as described below.

The rear gear 60 also includes a hub 70 which is suitably journaled within a bearing carrier 72 by a rear bearing 74. The rear bearing 74 rotatably supports the rear gear 60 in mesh engagement with the pinion 56.

The hub 70 of the rear gear 60 has a central bore through which the propulsion shaft 54 extends. The rear gear 60 also includes an annular front-facing engagement surface which carries a series of teeth 76 that positively engage the clutch element of the main clutch, similar to the front gear 58 and as described in more detail below.

As best seen in FIG. 2, the bearing carrier 72 rotatably supports the propulsion shaft 54 within the lower unit 40. A rear needle bearing assembly 78 supports the propulsion shaft 54 within the bearing carrier at an opposite end of the bearing carrier 76 from the rear gear 60.

The front end of the propulsion shaft 54 includes a longitudinal bore 80. The bore 80 extends from the front end of the shaft 54 to a point behind the vertical rotational axis of the drive shaft 30. In the illustrated embodiment, the bore 80 extends along a longitudinal axis of the propulsion shaft 54 to a point on the rear side of the rear driven gear 60. The propulsion shaft 54 also includes an aperture 82 that extends transversely to a longitudinal axis of the propulsion shaft 54 and is generally symmetrically positioned between the front driven gear 58 and the rear driven gear 60.

A first or main clutch of the transmission 50 desirably is a positive type clutch so as to transfer torque from the driven gears 58, 60 to the propulsion shaft 54 without slippage. In the illustrated embodiment, the main clutch is formed between the teeth of the driven gears 58, 60 and a clutch element 84, coupled to a plunger 86. This clutch element 84, as described below, includes a plurality of teeth, which cooperate with the teeth 68, 76 on the front driven gear 58 and the rear driven gear 60, respectively. Together, the clutch element 84 and the teeth 68, 76 on these gears 58, 60 form the main clutch that operates between the driven gears 58, 60 and the driveshafts 54. The main clutch thus selectively couples the propulsion shaft 54 either to the front gear 58 or to the rear gear 60. FIG. 2 illustrates the clutch element 84 in a neutral position (i.e., in a position in which the clutch element 84 does not engage either the front gear 58 or the rear gear 60).

The clutch element 84 generally has a spool-like sleeve shape and includes an axial bore, which extends between an annular front engagement surface and an annular rear engagement surface. The bore is sized to receive the propulsion shaft 54.

The annular engagement surfaces of the clutch element 84 are substantially coextensive in size with the corresponding annular engagement surfaces of the front and rear gears 58, 60. The annular engagement surfaces each support a plurality of teeth 88, 90 that are shaped and configured to engage the corresponding teeth 68, 76, on the front driven gear 58 and the rear driven gear 60, respectively.

The clutch element 84 has a spline connection with the propulsion shaft 54. Internal splines on the clutch element 54 engage external splines on the exterior surface of the propulsion shaft 54. This spline connection provides a driving connection between the clutch element 84 and the propulsion shaft 54, while permitting the clutch element 84 to slide over the propulsion shaft 54, as discussed below. The clutch element 84 also includes a hole that extends through generally in a mid section of the clutch body in a direction generally transverse to the longitudinal axis of the clutch bore. The hole is sized to receive a pin 92 which, when passed through the front aperture 82 of the propulsion shaft 54 and through a hole of the plunger 86, interconnects the plunger 86 and the clutch element 84 with a portion of the propulsion shaft 54 interpose therebetween. The pin 92 may be held in place by a press-fit connection between the pin 92 and the plunger 86 or by a conventional coil spring, which is contained within a groove about the middle of the clutch element 84.

The transmission 50 also includes a second or sub-clutch that operates between the propulsion shaft 54 and one of the driven gears 58, 60. In the illustrated embodiment, the rear gear 60 establishes a reverse drive condition and the sub-clutch operates between the propulsion shaft 54 and the rear gear 60. In the illustrated embodiment, the sub-clutch is formed between opposing shoulders 94, 96 formed on the propulsion shaft 54 and the rear gear 60, respectively. As seen in FIG. 2, the propulsion shaft 54 includes an annular projection that circumscribe the propulsion shaft 54. The rear side of this annular projection defines a generally flat surface that extends generally normal to the longitudinal axis of the propulsion shaft 54 and defines the frictional surface 94 of the propulsion shaft 54. The bore through the rear driven gear 60 also includes a counterbore, the bottom of which forms the opposing frictional surface 96 that cooperates with the frictional surface 94 on the propulsion shaft 54. In the illustrated embodiment, a washer 98 is positioned between the opposing friction surfaces 94, 96 and is placed over the propulsion shaft 54 so as to lie within the counterbore of the rear driven gear 60. Accordingly, the opposing friction surfaces 94, 96 on the propulsion shaft 54 and the rear gear 60 and the friction washer 98 form the sub-clutch of the transmission 50.

As understood from FIG. 2, the elements of the sub-clutch are more closely spaced together than the teeth of the main clutch. The required axial movement between the elements of the sub-clutch to engage the sub-clutch thus is less than the axial movement required to engage the elements of the main clutch.

A shifting mechanism 100 actuates the main and sub-clutches to move the clutch element 84 into and out of engagement with the front and rear gears 58, 60, and to compress the washer 98 between the opposing surfaces 94, 96 of the rear gear and the propulsion shaft 54 to actuate the sub-clutch.

The plunger 86 forms a portion of the shifting mechanism 100. The plunger 86 generally has a cylindrical rod shape and slides within the longitudinal bore 80 of the propulsion shaft 54 to actuate the clutch element 84. In the illustrated embodiment, the plunger is biased against a forward plunger 102 by compression spring 104. The compression spring 104 lies on the rear side of the plunger 86 while the front plunger 102 lies on the forward side of the plunger 86. As illustrated in FIGS. 2 and 3, the front end of the front plunger 102 is positioned within a slot formed in an actuating shift cam 106, and is biased against a first cam surface 108 of the shift cam 106.

The shift cam 106 also includes at least one and desirably a pair of second cam surfaces 110 that opposes a front end of the propulsion shaft 54. The second cam surfaces have identical shapes and are arranged on opposite sides of the first cam surface 108. A compressible biasing element 112, such as, for example, a compressible spring or washer, is interposed between the front end of the propulsion shaft 54 and the second cam surfaces 110 of the shift cam 106.

As best seen in FIGS. 4A–4C, the first and second cam surfaces differ in shape. The first cam surface includes three distinct regions A, B, C which are spaced from a rotational axis of the cam member 106 by different distances. As described in greater detail below, these regions A, B, C of the first cam surface 108 establish to a forward drive position, a neutral position and a reverse drive position, respectively, for the plunger 86. Each of the second cam surfaces 110 is shaped as a single cam lobe D that is distanced from the rotational axis of the cam member 106 so as to act against the biasing element 112 under only one drive condition. In one mode of operation, that drive condition is in reverse, as will be described below in greater detail. The cam lobes D of the second cam surface are arranged between the region B and C of the first cam surface that establish the neutral and reverse drive positions for the plunger 86.

Figure 3:
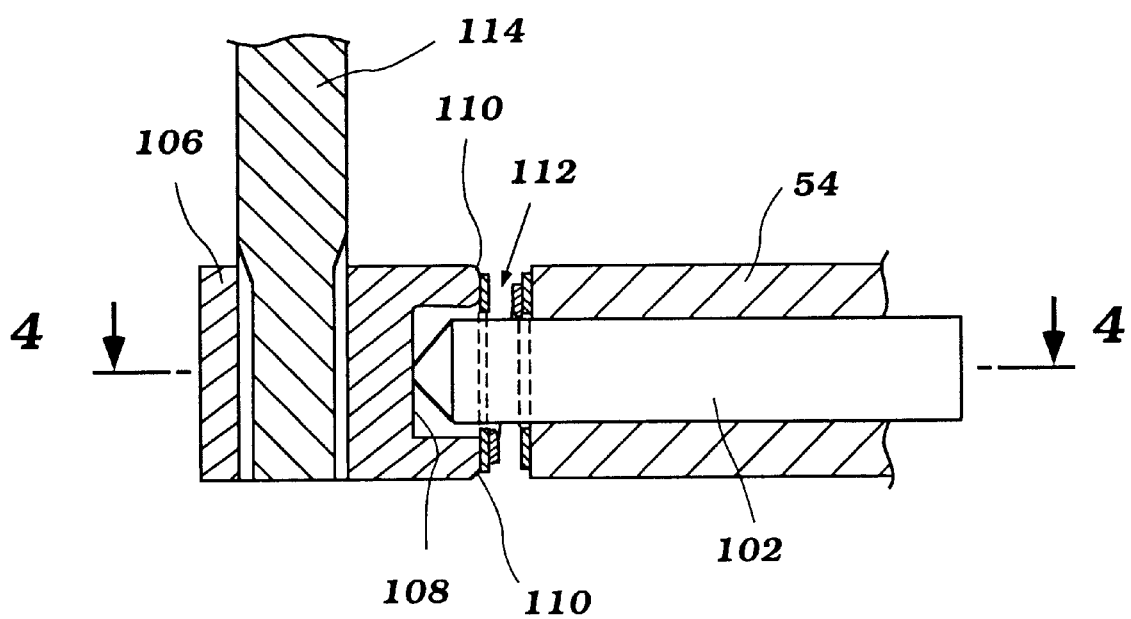
FIG. 3 is an enlarged, sectional side view of the shifting mechanism of FIG. 2, isolated from the surrounding structure and transmission.
Figure 4:
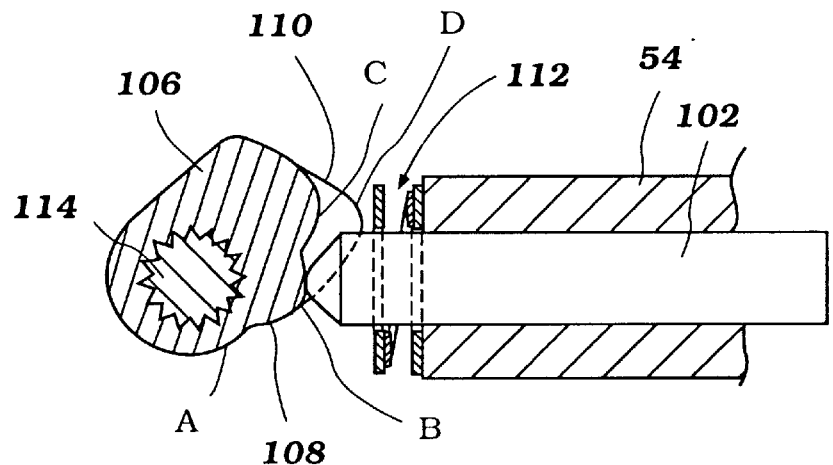
FIG. 4A is a sectional view of the shifting mechanism taken along line 4—4 with a shift cam of the shifting mechanism positioned in a neutral position.
FIG. 4B is a sectional view of the shifting mechanism taken along line 4—4 with the shift cam positioned in a forward drive condition.
FIG. 4C is a sectional view of the shifting mechanism taken along line 4—4 with the shift cam positioned in a reverse drive position.
Figure 4:
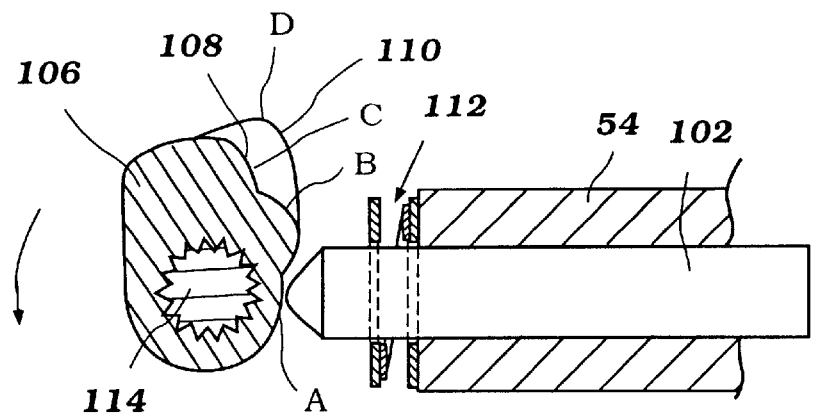
Figure 4:
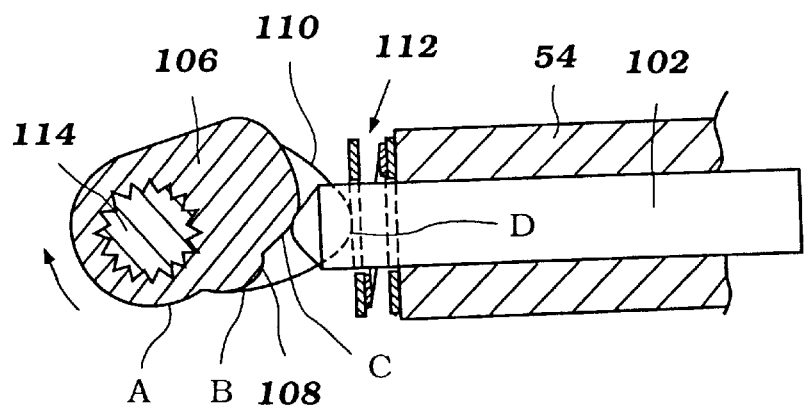

As understood from FIGS. 2 and 3, the cam member 106 is coupled to a shift rod 114 which extends outwardly to a transmission actuator mechanism (not shown). Rotation of the shift rod 114 rotates the cam member 106 about a generally vertically extending rotational axis (i.e., about an axis which is generally parallel to the rotational axis of the drive shaft 30).

The operation of the shift mechanism 100 and the transmission 50 will now be described in connection with FIGS. 2–4. With initial reference to FIGS. 2 and 4A, the shift mechanism 100 and the transmission 50 are shown in a neutral position. In this position, the main clutch element 84 lies between the front gear 58 and the rear gear 60 with the teeth 88, 90 of the clutch element 82 disengaged from the teeth 68, 76 of the front and rear gears 58, 60, respectively. The frictional surface 94 of the propulsion shaft 54 loosely contacts the friction washer 98 in this position.

In addition, as seen in FIG. 4A, the biasing spring 104 urges the front plunger 102 to contact the region B of the first cam surface 108 that corresponds to the neutral position. The second cam surfaces 110 do not engage the biasing element 112 in this position.

To establish a forward drive condition, the shift rod 114 is rotated in a counterclockwise direction in the illustrated embodiment, as shown in FIG. 4B. The forward end of the front plunger 102 follows the first cam surface 108 and moves in the forward direction under the force of the spring 104, which, in turn, slides the clutch element 84 forward over the propulsion shaft 54. The forward motion of the plunger 86 positively forces the front teeth 88 of the clutch element 84 into engagement with the teeth 68 of the front gear 58. So engaged, the front gear 58 drives the propulsion shaft 54 through the spline connection between the clutch element 84 and the propulsion shaft 54. The propulsion shaft 54 thus drives the propulsion device 52 in a first direction which asserts a forward thrust.

To establish a reverse drive condition, the shift rod 114 is rotated in a clockwise direction in the illustrated embodiment as shown in FIG. 4C. The lobes D second cam surfaces 100 of the shift cam 106 make contact with the biasing element 112 and compresses the element. As a result, the propulsion shaft 54 is urged in the rearward direction by the second cam surface 110 through the biasing element 112. The rearward axial movement of the propulsion shaft 54 causes the opposing friction surfaces 94, 96 to compress the friction washer 98 therebetween and to frictionally couple the propulsion shaft 54 to the rear gear 60. As a result, at least a portion of the power from the drive shaft 30 is transmitted to the propulsion shaft 54 through the frictional sub-clutch.

Region C of the first cam surface 108 then follows the lobe D of the second cam surfaces 110 and makes contact with the front end of the front plunger 102. Further rotation of the shift cam 106 forces the front plunger 102 in the rearward direction to move the rear plunger 86 and the clutch element 84 into engagement with the rear gear 60. In particular, the rearward motion of the plunger 86 positively forces the clutch element 84 into engagement with the rear gear 60 with a corresponding clutching teeth 90, 76, mating. An engagement between the clutch element 84 and the rear gear 60 establishes a positive connection between the rear gear and the propulsion shaft 54 so as to transfer power from the drive shaft 30 to the propulsion shaft 54 without slippage.

As is clear from the above description, the sub-clutch thus engages before the main clutch does. Thus, even though the slippage occurs between the elements of the sub-clutch, the rotation of the rear gear 60 is gradually transmitted to the propulsion shaft 54 through friction occurring between the propulsion shaft 54, the washer 98, and the rear gear 60.

As a result of the configuration between the sub and main clutches and the shifting mechanism, the coupling between the rear gear 60 and the propulsion shaft 54 can be accomplished more gradually (i.e., less abruptly), and rapid shift loading onto the engine 26 does not occur.

Although this invention has been described in terms of a certain preferred embodiment, other embodiments apparent to those of ordinary skill in the art are also within the scope of this invention. Accordingly, the scope of the invention is intended to be defined only by the claims that follow.

What is claimed is:

1. A shifting mechanism for a marine drive including a transmission with forward and reverse gears and a main clutch operating between the gears, the main clutch adapted to selectively couple one of the gears to a propulsion shaft by moving the main clutch to a forward, neutral or reverse drive position via the shifting mechanism, the shifting mechanism comprising a shift cam having a first cam surface adapted to actuate the main clutch and a second cam surface adapted to act upon the propulsion shaft, and a sub-clutch operating between propulsion shaft and the reverse gear, the first and second cam surfaces being configured so as actuate the sub-clutch before actuating the main clutch when the shifting mechanism moves the main clutch toward the reverse drive position.

2. A shifting mechanism as in claim 1, wherein the main clutch includes a positive clutch element.

3. A shifting mechanism as in claim 1, wherein the sub-clutch includes a friction clutch element.

4. A shifting mechanism as in claim 3, wherein the friction clutch element includes a first friction surface formed on the propulsion shaft and an opposing second friction surface formed on the reverse gear.

5. A marine drive comprising a transmission selectively coupling a propulsion shaft to a drive shaft, the propulsion shaft driving a propulsion device, the transmission including a drive gear and at least one driven gear that together operate between the drive shaft and the propulsion shaft, a first clutch operating between the driven gear and the propulsion shaft, and a second clutch also operating between the driven gear and the propulsion shaft and being adapted to couple together the driven gear and the propulsion shaft before the first clutch couples together the driven gear and the propulsion shaft.

6. A marine drive as in claim 5, wherein the first clutch includes a positive clutch element.

7. A marine drive as in claim 5, wherein the second clutch includes a friction clutch element.

8. A marine drive as in claim 7, wherein the friction clutch element includes a first friction surface formed on the propulsion shaft and an opposing second friction surface formed on the driven gear.

9. A marine drive as in claim 5 additionally comprising a transmission actuator including a rotatable shift cam, the shift cam having a first cam surface arranged to actuate the first clutch, and a second cam surface arranged to act upon the propulsion shaft to actuate the second clutch.

10. A marine drive as in claim 9, wherein the transmission actuator additionally includes a plunger that couples together the shift cam and the first clutch.

11. A marine drive as in claim 10, wherein the plunger is biased into engagement with the first cam surface.

12. A marine drive as in claim 9, wherein a biasing element operates between the propulsion shaft and the second cam surface.

13. A marine drive as in claim 5, wherein the transmission additionally includes a second driven gear, and the first clutch operates between the first and second driven gears to selectively couple the propulsion shaft to one of the first and second driven gears.

14. A marine drive as in claim 13, wherein the driven gears rotate in opposite directions such that the propulsion shaft rotates in a forward drive direction when coupled to the first driven gear and rotates in a reverse drive direction when coupled to the second driven gear, and the second clutch operates between the propulsion shaft and the second driven gears.

15. A marine drive as in claim 5, wherein the first clutch is actuated by relative axial movement between elements of the first clutch, the second clutch also is actuated by relative axial movement between elements of the second clutch, and the axial spacing between the elements of the second clutch is less than the axial spacing between the elements of the first clutch.

16. A marine drive as in claim 15, wherein both the first clutch and the second clutch are arranged so as to be actuated along a common axis about which the propulsion shaft rotates.

17. A marine drive comprising a transmission selectively coupling a propulsion shaft to a drive shaft under at least one drive condition, the propulsion shaft driving a propulsion device, the transmission including a drive gear and at least one driven gear that together operate between the drive shaft and the propulsion shaft, a main clutch operating between the driven gear and the propulsion shaft, and a sub-clutch also operating between the driven gear and the propulsion shaft, and means for actuating the sub-clutch before actuating the main clutch when establishing at least the one drive condition.

18. A marine drive as in claim 17, wherein the transmission includes a second driven gear, the first driven gear is arranged to drive the propulsion shaft in a forward drive direction when coupled to the propulsion shaft by the main clutch, the second driven gear is arranged to drive the propulsion shaft in a reverse drive direction when coupled to the propulsion shaft by the main clutch, and the sub-clutch operates between the second driven gear and the propulsion shaft.

19. A marine drive as in claim 18, wherein the main clutch includes a positive clutch element.

20. A marine drive as in claim 18, wherein the sub-clutch includes a friction clutch element.

21. A marine drive as in claim 20, wherein the friction clutch element is formed between a first friction surface on the propulsion shaft and an opposing second friction surface on the second driven gear.

22. A marine drive as in claim 18, wherein at least part of the means for actuating the sub-clutch is arranged on one side of the driven gears and the propulsion device is arranged on the opposite side of the driven gears relative to an axis of the propulsion shaft.

23. A marine drive comprising a transmission selectively coupling a propulsion shaft to a drive shaft, the propulsion shaft driving a propulsion device, the transmission including counter-rotating first and second gears, a first clutch element coupled to the propulsion shaft and operating between the first and second gears to selectively engage each gear, and a second clutch element operating between the second gear and the propulsion shaft, the second clutch element being formed by a first friction surface formed on the propulsion shaft and an opposing second fiction surface formed on the second gear.

24. A marine drive as in claim 23, wherein at least a portion of the propulsion shaft is axially displaceable to move the first friction surface into engagement with the second friction surface.

25. A marine drive as in claim 23, wherein the second gear is the reverse gear.

26. A marine drive as in claim 23 additionally comprising a transmission actuator arranged to engage the first and second friction surfaces of the second clutch element before the first clutch element engages the second gear.

* * * * *